March 29, 1966  H. W. WRIGHT  3,242,598
SHOVEL CART
Filed Feb. 26, 1965  2 Sheets-Sheet 1
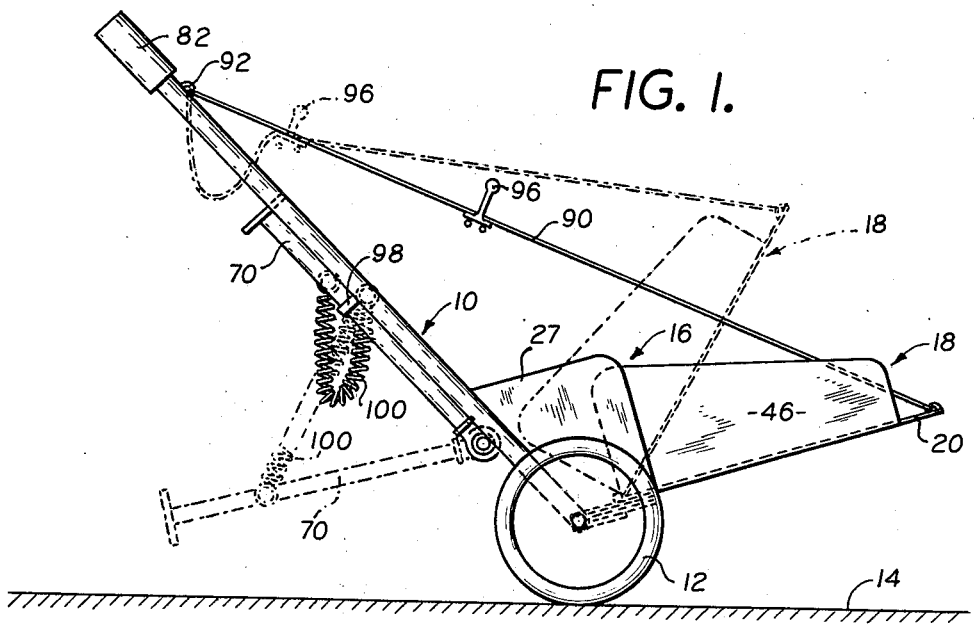
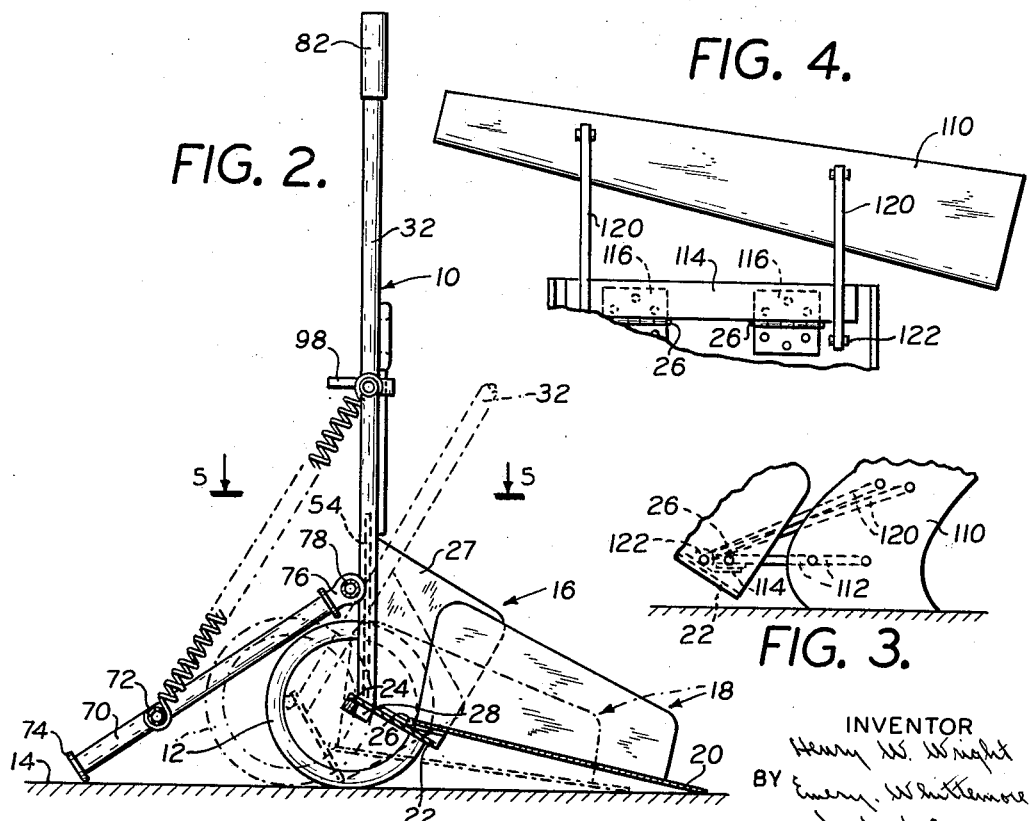
INVENTOR
Henry W. Wright
BY
ATTORNEYS.

March 29, 1966  H. W. WRIGHT  3,242,598
SHOVEL CART
Filed Feb. 26, 1965  2 Sheets-Sheet 2
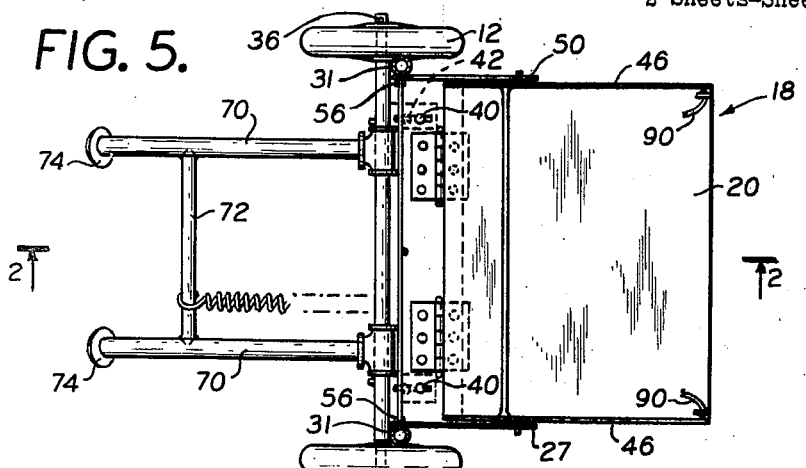
FIG. 5.
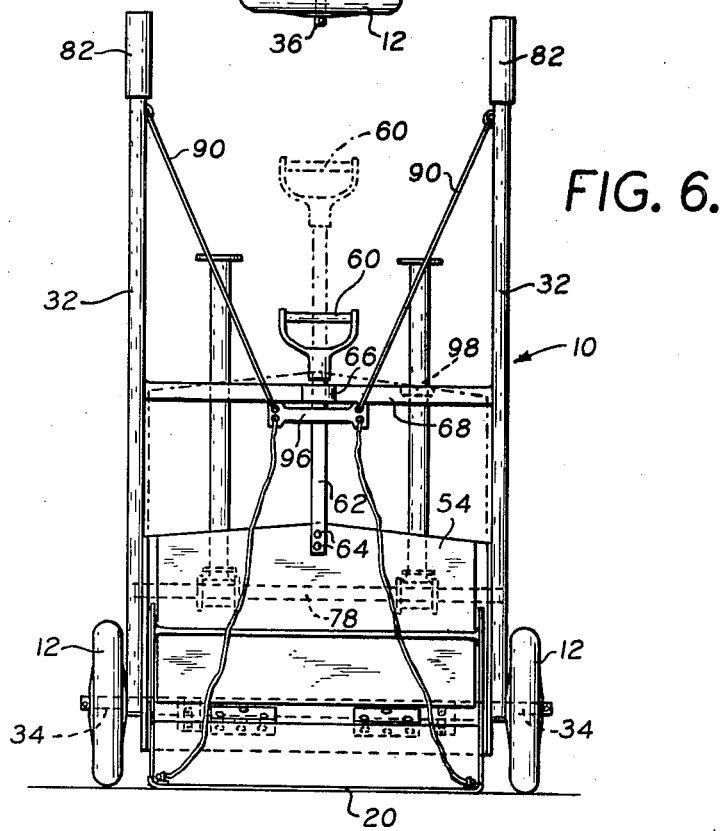
FIG. 6.
FIG. 7.
INVENTOR
Henry W. Wright
BY Emery, Whittemore
Dunbar & Graham
ATTORNEYS.

United States Patent Office 3,242,598
Patented Mar. 29, 1966

3,242,598
SHOVEL CART
Henry W. Wright, Hillcrest Ave., Towaco, N.J.
Filed Feb. 26, 1965, Ser. No. 435,486
13 Claims. (Cl. 37—130)

This invention relates to shovel carts of the type disclosed in my Patent No. 2,932,103 issued April 12, 1960. Such carts have a shovel portion with a bottom that can be placed close to the ground and which can be pushed into a pile of material in a manner similar to a shovel. The cart is then tilted rearwardly to cause the material on the bottom of the shovel portion to fall back into the cart.

It is an object of the invention to provide an improved cart of the character indicated. The invention is primarily concerned with providing a shovel cart in which the operator has a mechanical advantage for thrusting the shovel portion of the cart forward when the operator pulls rearwardly on handle levers.

Another object of the invention is to provide a shovel cart having an anchor member pivotally connected with a frame of the cart above the shovel portion, and to provide a substantially fixed fulcrum about which the frame of the cart swings when the anchor member is engaged with the ground behind the shovel cart.

Other objects are to provide a shovel cart construction in which an anchor member can be held in engagement with the ground by the operator's foot while both hands of the operator are free to pull back on the upper end of hand levers which rock the cart and thrust the lower shovel portion forward into a pile of material which is to be loaded into the cart.

Features of the construction relate to a simplified design for making the shovel cart inexpensive, rugged and convenient to operate.

Other objects, features and advantages of the invention will appear or be pointed out as the description proceeds.

In the drawing, forming a part hereof, in which like reference characters indicate corresponding parts in all the views:

FIGURE 1 is a side elevation of a shovel cart made in accordance with this invention;

FIGURE 2 is a sectional view taken on the line 2—2 of FIGURE 5 and illustrating the way in which the cart is operated for loading;

FIGURES 3 and 4 are side and top views of a portion of the cart with a blade suitable for plowing snow, substituted for the shovel portion shown in FIGURES 1 and 2;

FIGURE 5 is a sectional view taken on the line 5—5 of FIGURE 2;

FIGURE 6 is a front elevation of the shovel cart in the positions shown in FIGURES 2 and 5; and FIGURE 7 is a detail view of the axle at the lower end of the shovel cart frame.

The shovel cart shown in FIGURE 1 includes a frame 10 which is constructed of pipe or tube sections in the illustrated embodiment of the invention. There are two wheels 12, one on each side of the shovel cart at the lower end of the frame 10, for supporting the cart from the ground 14.

The shovel cart has a body, indicated generally by the reference character 16. This body includes a shovel portion 18 having a bottom plate 20 which is connected to a fixed plate 22 by a hinge 24. The hinge 24 has a pin 26 which is a pivot connection between the bottom plate 20 and the fixed plate 22. The plate 22 is rigidly connected, as by welding, to the lower ends of side plates 27 which are themselves welded or otherwise secured to the lower ends of handle portions 32 (FIGURE 5); and this plate 22 forms the lower part of the frame 10. An axle 30 has ends 34, of reduced cross sections, which serve as the bearings for the wheels 12. Cotter pins 36, or any other suitable retainers, hold the wheels 12 on the reduced ends 34 of the axle 30. The axle 30 has extensions 28 by which it is connected to the plate 22 with bolts 40 which extend through slots 42 in the extensions 28. This arrangement allows for a small forward or rearward movement of the axle, relative to the plate 22, depending upon the length of the slots 42 in the extensions 28. When the bolts 40 are slackened off, the axle can be moved to obtain the desired balance of the whole shovel cart.

The shovel portion 18 also includes side plates 46 secured at their lower ends to the bottom plate 20 and extending upwardly to form sides of the shovel cart body.

The body 16 also includes the side plates 27 which extend forwardly far enough to overlap the rearward ends of the side plates 46 of the shovel portion and the correlation is such that the rearward ends of the side plates 46 never move beyond the forward ends of the side plates 27 for any position that the shovel portion 18 occupies during the operation of the cart. Thus the body always has side walls extending rearwardly to the frame 10 without interruption.

There is a back wall 54 (FIGURES 2 and 5) of the body; and this back wall extends from one handle portion to the other. It slides in channel guides 56 secured to the inside faces of the side walls 27, best shown in FIGURE 5.

When the back wall 54 is in its lower most position, it rests on the fixed plate 22; but there is a handle 60 (FIGURE 6) at the upper end of a pull rod 62 which is secured to the back wall 54 by fastenings 64. The pull rod 62 slides in a bearing 66 in a cross brace 68 welded to the handle portions intermediate the upper and lower ends of the handle portions 32. This cross brace 68 forms a rigid part of the frame 10.

When the handle 60 is pulled upwardly, it raises the back wall 54 and leaves an opening in the back of the body 16 for dumping the contents of the cart.

The cart has two anchor members 70 rigidly secured to one another by a cross brace 72 near the rearward ends of the anchor members 70. In the illustrated construction there is a flange 74 secured to the rearward end of each of the anchor members 70 for the engagement with the ground. These flanges tend to dig into the ground when pressed into engagement with the ground, as shown in FIGURE 2. Other ends for bracing the anchor members 70 against movement with respect to the ground 14 can be used in place of the flanges 74. At their forward ends, each of the anchor members 70 has a fitting 76 which pivots on another cross brace 78 rigidly connected between the handle portions 32 at a location somewhat above the axle 30. This pivot connection between the fittings 76 and the cross brace 78 provides a fulcrum about which the frame 10 of the shovel cart rocks when an operator pulls the upper ends of the handle portions 32 rearwardly from the dotted-line position shown in FIGURE 2 to the full-line position. With the anchor members 70 held in contact with the ground so that they can not move rearwardly, the shifting of the handle portions 32 from the dotted to the full-line positions shown in FIGURE 2 causes the lower end of the shovel cart to move forwardly so that the wheels 12 and shovel portion 18 advance from the dotted line to the full-line positions shown in FIGURE 2. Thus the shovel portion is moved along the ground 14 into any pile of material which is to be loaded on the shovel cart.

There are hand grips 82 at the upper ends of the handle portions 32 by which an operator grips the shovel cart frame to pull the upper end rearwardly when the shovel portion is to be thrust into a pile of material. The mechanical advantage gained by the operator is substantially equal to the distance from the hand grip 82 to the pivot axis of the fittings 76 on the cross brace 78 divided by the distance of this pivot axis from the pin 26 of the hinge 24. The shovel cart can be designed for greater or lesser mechanical advantage by locating the cross brace 78 lower or higher on the handle portions 32 or by providing longer handle portions 32.

When the shovel portion 18 is being moved along the ground, as indicated in FIGURE 2, the forward end of the fixed plate 22, which is some distance forward of the hinge pin 26, is spaced below the bottom plate 20 of the shovel portion, as is clearly shown in FIGURE 2. When the handle portions 32 have been rocked counterclockwise some distance further than the full-line position shown in FIGURE 2, the portion of the fixed plate 22 which is ahead of the hinge pin 26, contacts with the bottom plate 20 and lifts the shovel portion of the cart from the ground. FIGURE 1 shows the shovel portion 18 lifted a substantial distance from the ground.

There is a flexible cable connection 90 between the forward end of the bottom plate 20 and fittings 92 near the upper end of the frame. The operator can swing the shovel portion 18 upwardly by pulling on the cable connection 90. FIGURE 1 shows the shovel portion 18 in broken lines in a raised position which causes material on the shovel portion to slide into the rearward part of the body and against the back wall 54 so that the material can be discharged from the cart by raising the back wall 54. It will be understood that the shovel cart can be tilted back further than shown in FIGURE 1, and shaken if necessary, in order to discharge all of the material from the body 16.

There is a handle 96 attached to the cable connection 90 to facilitate pulling the shovel portion 18 into a raised position.

The anchor members 70 can be swung into raised positions so as to be out of the way when the shovel cart is being transported from place to place. FIGURE 1 shows the anchor members 70, in full lines, in a raised position in which they can be held by clips 98 at a location attached to the cross brace 68. In the preferred construction, there is a spring 100 connected at its upper end with the cross brace 68 and its lower end with the cross brace 72. This spring holds the anchor member 70 in a position where they do not drag on the ground but in which they are at a convenient height for an operator to step on the cross brace 72, or the anchor member 70, to bring them into contact with the ground preparatory to a thrust of the shovel cart into a pile of material.

FIGURES 3 and 4 show a blade or snow plow attachment which can be used on the shovel cart in place of the shovel portion 18. This attachment includes a blade 110 attached to struts 112 which extend from a plate 114 with hinge portions 116. The conversion is made by removing the hinge pins 26 (FIGURE 2) and then bringing the hinge portions 116 into the positions formerly occupied by the parts of the hinge 24 which are attached to the bottom plate 20 of the shovel portion 18. The hinge pins 26 are then replaced to connect the hinge portions 116 of the snow plow attachment to the parts of the hinge 24 which remain attached to the fixed plate 22. Other struts 120 extend from the blade 110 to lugs 122 on the fixed plate 22; and these struts 120 are connected with the lugs 122 by detachable fastening means such as cotter pins. Struts 112 and 120 are pivoted to blade 110.

The preferred embodiments of the invention have been illustrated and described, but changes and modifications can be made and some features can be used in different combinations without departing from the invention as defined in the claims.

What is claimed is:

1. A shovel cart comprising a frame having wheels at its lower end for supporting the cart from the ground, a body including a shovel portion having a rearward end pivotally connected with the frame near the lower end thereof and extending forward from the frame, an anchor member pivotally connected with the frame above the pivot connection of the shovel portion to the frame and extending rearward from the frame, a handle portion of the frame extending upward to a height for gripping by a person standing behind the frame, the anchor member having a rearward end that contacts with the ground to prevent rearward movement of pivot connection of the anchor member when the handle portion is pulled rearwardly at its upper end to rock the frame about its pivot connection to the anchor member and thereby thrust the lower end of the frame and the shovel portion of the body forward.

2. The shovel cart described in claim 1 characterized by the anchor member being pivotally connected with the frame at a location above the axis of rotation of the wheels.

3. The shovel cart described in claim 2 characterized by the wheels being located at opposite sides of the cart and the handle portion of the frame including two handles extending upward at opposite sides of the cart to a height for convenient gripping by both hands of a person standing behind the cart.

4. The shovel cart described in claim 1 characterized by the cart having a surface at the lower end of the frame and at the back of the frame in position to be pushed by a foot of a person standing behind the cart to assist in thrusting the shovel portion of the body forward.

5. The shovel cart described in claim 1 characterized by there being two anchor members extending rearward from the frame for contact with the ground, and a connector between the anchor members for holding both of the anchor members down.

6. The shovel cart described in claim 1 characterized by the anchor member being movable about its pivot connection into a raised position with the rearward end of the anchor member extending upward and in the general direction of the handle portion, a releasable retainer on the cart in position to hold the anchor member in its raised position.

7. The shovel cart described in claim 6 characterized by a spring connected between the frame and the anchor member for holding the anchor member at an intermediate position extending rearwardly but out of contact with the ground and in position to be pushed down against the force of the spring and into contact with the ground by foot pressure of a person standing behind the cart.

8. The shovel cart described in claim 1 characterized by the lower portion of the frame extending forward of its pivot connection with the shovel portion of the body and under the shovel portion in position to lift the shovel portion from the ground when the handle portion of the frame is rocked rearwardly beyond a given angle.

9. The shovel cart described in claim 8 characterized by means for pulling the shovel portion upward above the forwardly extending portion of the frame and into a position in which the shovel portions slopes downwardly and rearwardly at a steep slope, side walls on the shovel portion, other side walls on the frame and overlapping the side walls on the shovel portion, and a back wall with a gate that opens to discharge material from the body of the cart.

10. A shovel cart comprising a frame having wheels at its lower end for supporting the cart from the ground, a body including a shovel portion having a rearward end pivotally connected with the frame near the lower end thereof and extending forward from the frame, the shovel portion having sides extending upward therefrom, the body also including rigid side portions secured to the frame and extending forward adjacent to and overlapping the sides of the shovel portion, a back for the body carried by the frame and forming with the shovel portion and the rigid sides a container into which material on the shovel portion slides when the shovel portion is swung about its pivot connection to the frame to raise the front end of the shovel portion to a steep slope, and a handle portion of the frame extending upward to a height for gripping by a person standing behind the frame.

11. The shovel cart described in claim 10 characterized by a flexible connector leading from an upper part of the frame to a forward location on the shovel portion for pulling the shovel portion upward to a steep slope.

12. The shovel cart described in claim 10 characterized by the back of the body being movable into position to dump the contents of the body.

13. The shovel cart describe in claim 10 characterized by the back of the body including a door, guides on the frame in which the door slides up and down between raised and lowered positions, the door when in raised position leaving an opening at the bottom of the body for discharge of the contents of the container.

References Cited by the Examiner
UNITED STATES PATENTS

| | | | |
|---|---|---|---|
| 662,740 | 11/1900 | Richardson. | |
| 712,126 | 10/1902 | Felton | 37—130 |
| 3,021,625 | 2/1962 | Stasse | 37—130 |
| 3,121,963 | 2/1964 | Nolan | 37—130 X |

HUGO O. SCHULZ, *Primary Examiner.*